United States Patent [19]
Leis

[11] Patent Number: 6,061,644
[45] Date of Patent: *May 9, 2000

[54] SYSTEM FOR DETERMINING THE SPATIAL POSITION AND ORIENTATION OF A BODY

[75] Inventor: Stephen Eldon Leis, Waterloo, Canada

[73] Assignee: Northern Digital Incorporated, Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/985,462

[22] Filed: Dec. 5, 1997

[51] Int. Cl.⁷ .............................. G06F 15/00; G01B 11/00
[52] U.S. Cl. .......................... 702/153; 702/152; 702/154; 382/103
[58] Field of Search .................................. 702/152–154; 382/103–104, 154; 345/156–158

[56] References Cited

U.S. PATENT DOCUMENTS

| | | | |
|---|---|---|---|
| 4,649,504 | 3/1987 | Krouglicof et al. | 702/153 |
| 4,652,917 | 3/1987 | Miller | 358/107 |
| 4,764,668 | 8/1988 | Hayard | 235/470 |
| 5,227,985 | 7/1993 | DeMenthon | 702/153 |
| 5,530,771 | 6/1996 | Maekawa | 382/103 |
| 5,617,335 | 4/1997 | Hashima et al. | 364/516 |
| 5,828,770 | 10/1998 | Leis et al. | 382/103 |

Primary Examiner—Marc S. Hoff
Assistant Examiner—Bryan Bui
Attorney, Agent, or Firm—Fish & Richardson P.C.

[57] ABSTRACT

A system for determining the spatial position and orientation of each of a plurality of bodies. Each one of the bodies has at least three markers in a predetermined, relative geometric relationship. The markers are adapted to emit energy in response to an activation signal and/or to reflect energy impinging upon such passive marker from an activatable energy source. A common energy detector is provided for detecting the energy emitted by the active marker and the energy reflected by the passive marker. A common processor is provided. The processor has a memory. The memory has stored therein the predetermined, relative geometric relation of the markers for each one of the bodies. The processor compares the stored predetermined geometric relation of the markers for each of the bodies with the energy detected by the energy detector to identify the bodies emitting/or reflecting the detected energy. With such an arrangement, a body can be tracked using a very simple sequence of operation in real-time with robust positive marker identification by taking advantage of a simple marker placement methodology. Multiple bodies can scan thereby be tracked simultaneously.

12 Claims, 16 Drawing Sheets

FIGURE 5  Generate Raw 3D Marker Table, 52(FIG. 16)

Generate Segment Raw Marker Cross Reference Table for All Bodies

FIGURE 9A

| Energy Source LeftSources=4 | U Location (pixels) | V location (pixels) |
|---|---|---|
| $S_1$ | 1300.53 | 3025.50 |
| $S_2$ | 2300.82 | 1500.79 |
| $S_3$ | 1500.76 | 3325.78 |
| $S_4$ | 2048.16 | 1130.94 |
| ... | | |

Left Sensor Energy Source Location Table, 50L

FIGURE 9B

| Energy Source LeftSources=4 | U Location (pixels) | V location (pixels) |
|---|---|---|
| $S_5$ | 1313.53 | 2325.50 |
| $S_6$ | 1523.82 | 1300.79 |
| $S_7$ | 1715.76 | 2325.78 |
| $S_8$ | 1348.16 | 3130.94 |
| ... | | |

Right Sensor Energy Source Location Table, 50R

FIGURE 10

| Raw Marker Number RawMarkers=4 | X | Y | Z |
|---|---|---|---|
| $R_1$ | 7.1346 | 83.6348 | -2016.5673 |
| $R_2$ | 7.2096 | 23.6350 | -2016.4579 |
| $R_3$ | 7.1346 | 83.6348 | -2066.5673 |
| $R_4$ | 50.9067 | 23.6453 | -2040.7595 |
| 5 | | | |
| ... | | | |
| M | | | |

Raw 3D Marker Table, 52

FIGURE 11

| Marker | $X^1$ | $Y^1$ | $Z^1$ |
|---|---|---|---|
| $12_a$ | 0 | 0 | 0 |
| $12_b$ | 50 | 0 | 0 |
| $12_c$ | 0 | 60 | 0 |

Marker Position Table, 42

FIGURE 12

| Segment | Length |
|---|---|
| $SL_{ab}$ | 60 |
| $SL_{bc}$ | 78.10 |
| $SL_{ac}$ | 50 |

Marker Segment Length Table, 44

FIGURE 13

| Marker | Segment 1 | Segment 2 |
|---|---|---|
| $12_a$ | $SL_{ab}$ | $SL_{ac}$ |
| $12_b$ | $SL_{ab}$ | $SL_{bc}$ |
| $12_c$ | $SL_{ac}$ | $SL_{bc}$ |

Marker Segment Set Table, 48

FIGURE 14

| Angle | Segment 1 | Segment 2 | Dot Product |
|---|---|---|---|
| $\Theta_{ab}$ | $SL_{ab}$ | $SL_{bc}$ | 3600 |
| $\Theta_{a,c}$ | $SL_{ab}$ | $SL_{ac}$ | 0 |
| $\Theta_{bc}$ | $SL_{bc}$ | $SL_{ac}$ | 2500 |

Marker Segment Dot Product Table, 46

FIGURE 15

| Segment | Total Raw Pairs | Raw Marker Pairs | | | | | |
|---|---|---|---|---|---|---|---|
| | | Pair 1 | Pair 2 | Pair 3 | Pair 4 | ... | Pair N |
| $SL_{ab}$ | 1 | $R_1,R_2$ | | | | | |
| $SL_{bc}$ | 3 | $R_1,R_4$ | $R_3,R_4$ | $R_2,R_3$ | | | |
| $SL_{ac}$ | 2 | $R_2,R_4$ | $R_1,R_3$ | | | | |

Segment Raw Marker Cross Reference Table, 56

FIGURE 16

| Segment | Qualified |
|---|---|
| $SL_{ab}$ | TRUE |
| $SL_{bc}$ | TRUE |
| $SL_{ac}$ | TRUE |

Qualified Segment Table, 58

FIGURE 17

| Marker | X | Y | Z |
|---|---|---|---|
| $12_a$ | 7.2096 | 23.6350 | -2016.4579 |
| $12_b$ | 50.9067 | 23.6453 | -2040.7595 |
| $12_c$ | 7.1346 | 83.6348 | -2016.5673 |

Measured Marker Position Table, 60

FIGURE 18

| Roll (Radians) | Pitch (Radians) | Yaw (Radians) | X(mm) | Y(mm) | Z(mm) |
|---|---|---|---|---|---|
| 0.00023 | 0.50754 | -0.00208 | 7.209 | 23.634 | -2016.457 |

Caclulated Rigid Body Position and Orientation Table, 62

SYSTEM FOR DETERMINING THE SPATIAL POSITION AND ORIENTATION OF A BODY

BACKGROUND OF THE INVENTION

This invention relates generally to systems for determining the spatial position and angular orientation (i.e. pose) of a body, or object.

As is known in the art, systems are available for determining the spatial position and angular orientation of a body (or object). One such system includes passive retro-reflectors as point markers, or targets, affixed to the body and a second system includes active radiating emitters as the affixed point markers. Both techniques operate by projecting the image of a high contrasting marker onto spaced sensors and using mathematical processing to determine the three dimensional coordinates of each one of the point markers. These three dimensional coordinates (i.e., 3D) are then used as discrete points, or may be considered as a set if their geometric arrangement is known, resulting in the determination of the position and angular orientation of the body (i.e., six degrees of freedom: x,y and z positions and pitch, yaw and roll angular orientations) in space relative to a three dimensional coordinate system centered at a preselected point in space, typically at a point fixed relative to the sensors.

Determining the spatial position and either the vector angle or angular orientation of a body has several uses. For example, a pointing device can be made out of the body whereby the end tip of the pointing device is in a known position relative to the markers. Such a pointing device can be used as a digitizing pointer held by hand as in reverse engineering applications. An operator moves this pointing body to various known places on a manufactured component and the accuracy of the manufacturing processes is determined from analysis of the determined end tip position of the pointing device. This application requires a highly accurate system.

In another applications, such as in an image guided surgical procedure the instrument pose is being tracked with respect to the patient. Certain surgical instruments have affixed to them markers. This information can be used to allow the surgeon to see where the instrument is pointing on a MR or CT scan, and what is beyond the end tip of the surgical instrument. This application also requires a highly accurate system.

In one emitting marker (i.e., an active marker) system, multiple charge couple device (CCD) sensors are used to detect the energy emitted by the marker. A single point marker is energized per sensor cycle to emit infrared energy. During each sensor cycle, the emitted energy focused onto the sensor is collected (i.e. integrated) and shifted to the sensor processing circuitry. In order to determine the 3D position of the marker, the marker must be detected on at least three sensor axes (i.e. to cover a minimum of 3 orthogonal planes). There are many advantages to a system which uses emitting markers including high contrast images being produced on the sensors, control over activation of each of the markers affording positive and automatic marker discrimination, and the ability to use high speed linear sensors. High speed linear sensors are relatively expensive and only one marker can be tracked during a single sensor cycle.

In one retro-reflective marker (i.e., a passive marker) system, an energy source is energized to emit infrared energy in the general direction of the retro-reflective marker. Multiple CCD sensors are then used to detect the energy reflected by the marker. During each sensor cycle, the reflected energy focused onto the sensor is collected (i.e., integrated) and shifted to the sensor processing circuitry. In order to determine the 3D position of the marker, the marker must be detected on at least three sensor axes (i.e. to cover a minimum of 3 orthogonal planes). There are many advantages to a retro-reflective marker system including the use of wireless markers and the ability to use inexpensive low speed area array sensors. These systems, however, suffer from problems associated with positively identifying markers.

It is desirable to use a cost effective area array sensor which is capable of tracking multiple markers during a single sensor cycle. As is known in the art there are systems that make use of single area array sensor and inexpensive components. DeMenthon (Patent Number 5,227,985) teaches a system which uses a single sensor and matrix techniques to determine the pose of a body. This system is limited to noncoplanar markers and is based on projection methods to extract 6D information from 2D images. This method will not have sufficient accuracy for medical applications. As is well known in the art, the error in the depth measurement is prohibitively large for this type of system. Triangulation methods have a distinct advantage of projection methods for the depth accuracy. Triangulation methods, also called stereometric techniques, were rejected due to the costly hardware required to perform real-time calculations. Multiple marker triangulation methods with area array sensors have the additional problem of poor marker identification, which is typically solved with human intervention. Prior systems can operate poorly in the presence of real-life situations of stray IR sources and reflections that will appear to be unwanted and unexpected markers. Prior systems can also operate poorly in the presence of multiple bodies in close proximity to each other.

SUMMARY OF THE INVENTION

In accordance with the present invention, a system for determining the spatial position and orientation of each of a plurality of bodies is provided. Each one of the bodies has at least three markers in a predetermined, relative geometric relationship. The markers are adapted to emit energy in response to an activation signal and/or to reflect energy impinging upon such passive marker from an activatable energy source. A common energy detector is provided for detecting the energy emitted by the active marker and the energy reflected by the passive marker. A common processor is provided. The processor has a memory. The memory has stored therein the predetermined, relative geometric relation of the markers for each one of the bodies. The processor compares the stored predetermined geometric relation of the markers for each of the bodies with the energy detected by the energy detector to identify the bodies emitting/or reflecting the detected energy.

With such an arrangement, a body can be tracked using a very simple sequence of operation in real-time with robust positive marker identification by taking advantage of a simple marker placement methodology. Multiple bodies can thereby be tracked simultaneously.

In accordance with another feature of the invention, each body must have markers in a known and fixed relative geometry and must have unique segment lengths amongst all pairs of all the markers, where the term unique is a threshold value difference based on the accuracy of the system (i.e., the difference in the geometric relations of the markers for the bodies is detectable). Multiple objects can be tracked simultaneously if pairs of like segments amongst all bodies being tracked have unique relative angles, again where the term unique is a threshold value difference based on the accuracy of the system. The marker geometry can be collinear or coplanar as required by the applications.

Further, with such an arrangement, a system is provided adapted to track the pose of a body with 3 or greater markers in a known relative geometry, subject to simple placement rules, which are not limited to being non-coplanar or non-collinear. The system is able to use a cost effective, low speed, area array sensors that can track multiple markers in a single sensor cycle, thus increasing the apparent sampling rate of each of the markers.

In accordance with another feature of the invention, the system uses a stereometric arrangement of sensors, thus providing adequate accuracy for high performance applications such as surgical application.

Further, the system as able to use cost effective digital signal processors and simple processing calculations steps which will automatically and positively identify the discrete markers of the body in three-dimensions (3D) and operate in the presence of many false markers and multiple bodies in close proximity. The system is adapted to determine the pose of one or more bodies in real-time in a closed form solution using a single sensor cycle image rather than using predictive methods to continue tracking the pose of a body given several sensor cycle images.

Further, the system is adapted to automatically recognize and track various bodies that are known in advance of tracking.

BRIEF DESCRIPTION OF THE DRAWINGS

Other features of the invention will become more readily apparent with reference to the following description taken together with the following drawings, in which:

FIG. 7 shows the relationship among FIGS. 7A–7C and FIG. 8 shows the relationship between FIGS. 8A and 8B;

FIGS. 9A, 9B to 18 illustrate detailed examples of the elements in the memory of FIG. 3 at various stages of execution the system of FIG. 1.

DESCRIPTION OF THE PREFERRED EMBODIMENTS

Figure 1:
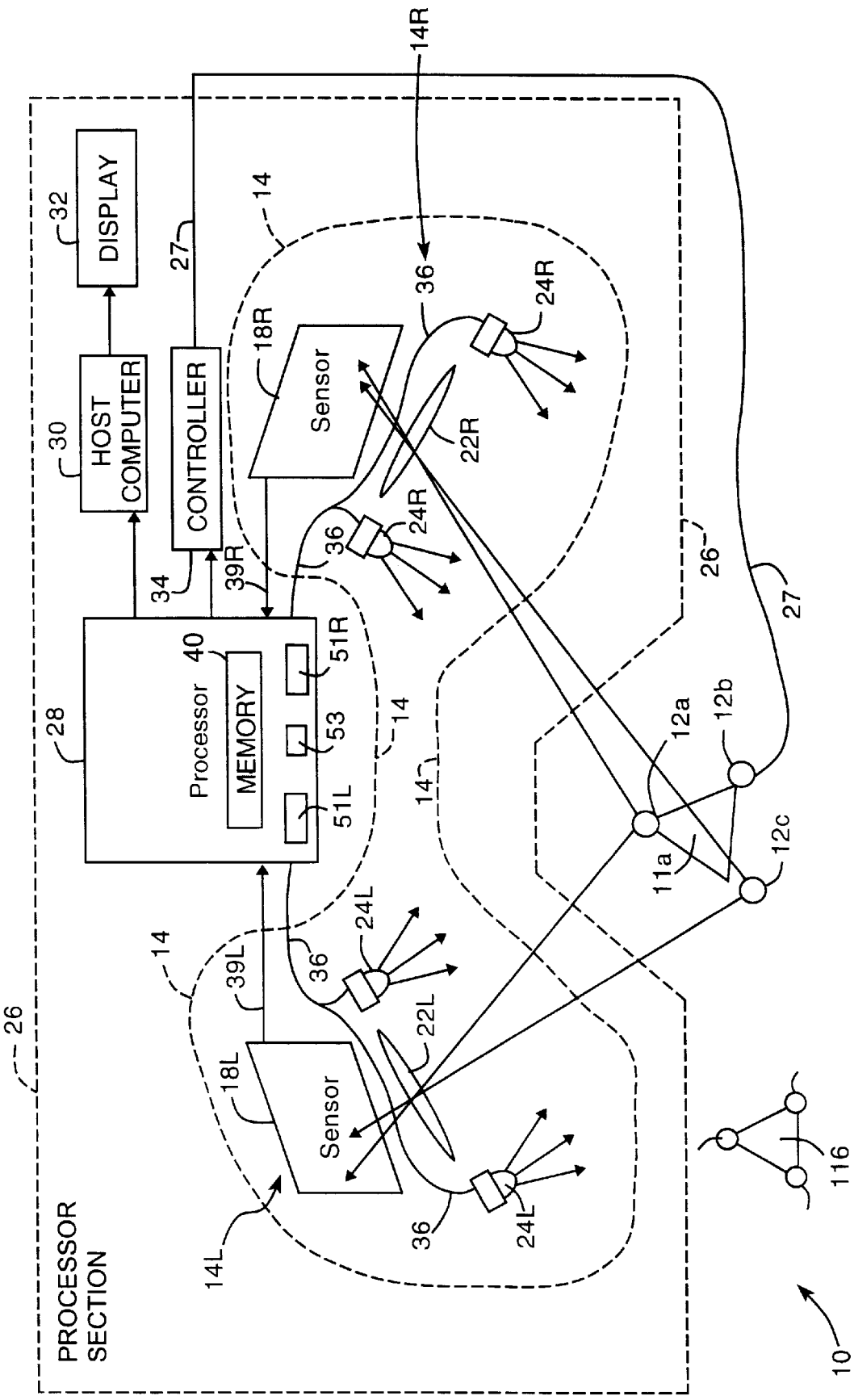
FIG. 1 is a block diagram of a system for determining the spatial position and orientation of a pair of rigid bodies according to the invention.
Figure 2:
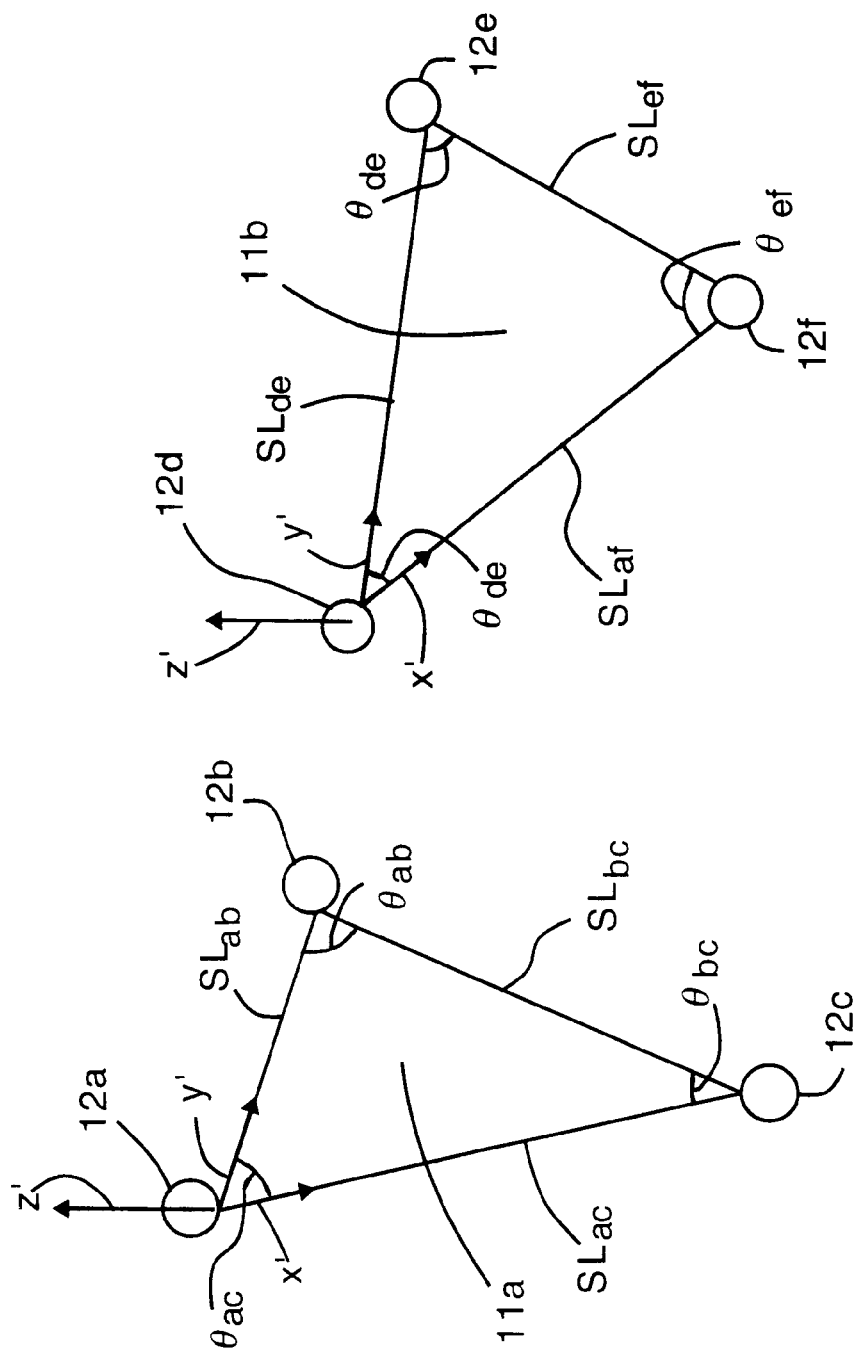
FIG. 2 shows the pair of bodies adapted for use in the system of FIG. 1.

Referring now to FIG. 1, a system 10 is provided for determining the spatial position and orientation of one or more, here a pair of, rigid bodies 11a, 11b, is provided. Here, the rigid bodies 11a, 11b, shown and described in more detail in FIG. 2, are different surgical instruments. Here, rigid body 11a has a plurality of, here two passive, retro-reflecting point markers 12a, 12c, and one active, emitting marker 12b affixed thereto. Here, each of the energy retro-reflecting markers 12a, 12c includes a sphere, affixable to body 11a, covered with a retro-reflective material as is generally available and well known in the art. The markers 12a, 12b, 12c are affixed to body 11a in a predetermined, fixed relative geometric relationship. The predetermined, fixed relative geometric relation is defined by simple placement rules described below.

Referring again to FIG. 1, the system 10 includes a common energy detection system 14 for detecting both the energy emitted by the active marker 12b affixed to body 11a and the energy reflected by the passive markers 12a, 12c affixed to the body 11a. The common detector system 14 includes a pair of spaced, left mounted and right mounted sensor assemblies 14L and 14R, respectively. Each one of the sensor assemblies 14L, 14R includes: a two-dimensional, charge couple device (CCD) sensor 18L, 18R (FIG. 1), respectively; a focusing lens 22L, 22R, respectively, as shown; and, a plurality of light energy emitting sources 24L, 24R (here infrared energy emitting diodes), respectively, as shown.

Each of the sensor assemblies 14R and 14L has its own u, v, $z_s$ co-ordinate system aligned with its associated directional infrared energy sources 24L, 24R, respectively. The light emitting sources 24L, 24R are evenly distributed circumferentially about the $z_s$ axis of each of the sensor assemblies 14R and 14L, respectively. The plurality of light emitting sources 24L, 24R is energized with electrical energy by a processor section 26. The processor section 26 includes a processor 28, host computer 30, display 32 and controller 34. The processor 28 energizes the light emitting sources 24L, 24R via a signal on line 36. The plurality of light emitting sources 24L, 24R operate to produce an incident directional energy beam of infrared energy with a direction of propagation aimed along a directional axis which generally corresponds to the $z_s$ axis of each of the sensor assemblies 14L, 14R associated with that directional energy source 24L, 24R. The incident directional energy beam created by the directional infrared energy source is of a size, shape and intensity that corresponds to the volumetric field of view of its associated sensor assembly 14L, 14R and sufficient to provide an incident directional energy beam throughout the measurement volume.

The sensor assemblies 14L, 14R are each able to produce output signals on lines 39L, 39R, respectively, which represent the intensity of energy focused thereon. During each sensor cycle, the energy focused thereon is collected (i.e. integrated) and then shifted to the processor 28. Here, the sensor assemblies 14L and 14R are mounted to a fixed reference and are separated from each other by a predetermined distance, here 500 mm. Here, the sensor assemblies 14L, 14R each have a field of view sufficient to observe a common measurement volume of approximately 1 m³ centered along the $z_s$ axis at approximately 1.9 m from the origin point which is midway between the lenses 22L and 22R.

As noted above, each of the sensor assemblies 14L and 14R has its own associated lens 22L, 22R, respectively, for focusing both the reflected energy from the energy retro-reflecting markers 12a, 12c and the emitted energy from the energy emitting marker 12b, in order to create a focused energy image of the emitted or reflected energy from the markers 12a, 12b, 12c respectively on the lenses 22L, 22R associated sensor assemblies 14R, 14L, respectively.

The processor 28 is coupled to the sensor assemblies 14L and 14R and determines the two-dimensional u, v positions of the focused energy image on each of the sensor assemblies 14L and 14R. Then, using the u, v position of the focused energy image of the same marker 12a, 12b, 12c on each of the sensor assemblies 14L and 14R to generate left and Right Sensor Energy Source Location Tables 50L, 50R (FIGS. 3 and 9A, 9B) and set the Left-Sources and Right Sources counters 51L, 51R, to be described.

The processor 28 is coupled to the host computer 30 in order that the spatial position of the bodies 11a, 11b can be displayed on display 32 or further processed by the host computer 30. As noted above, the processor 28 is coupled to the directional energy sources 24L, 24R in order that the processing section 26 can activate the directional energy sources 24R and 24L at appropriate times. The processor 28 is also coupled to the controller 34 in order that the processor 28 can signal the controller 34 to activate the energy emitting markers 12b at the required time via line 27.

The operation of system 10 will be described for body 11a, it being understood that the sequence of operations is substantially the same, or equivalent, for other rigid bodies, such as body 11b. Thus, the active marker 12b is fed via a cable 27 (FIG. 1) to controller 34, as shown. Here, as noted above, the energy emitting marker 12b include an infrared energy emitting diode of marker 12b which, upon being energized with electrical energy fed thereto by controller 34 via the cable 27, emits infrared light energy. Such infrared energy emitting diodes are generally available and well known in the art.

Referring now in more detail to FIG. 2, the rigid bodies 11a and 11b, are have affixed thereto markers 12a–12c and 12d–12f, respectively. It should first be understood that it is not relevant that marker 12a, and 12c are retro-reflective and marker 12b is active. This configuration is for example only and the methods described below are independent of the marker type. Each body 11a, 11b has the markers 12a, 12b, 12c and 12d, 12e, 12f, respectively, affixed to it in a predetermined (i.e., known) and fixed relative geometry. Further, the relative geometry for the markers 12a, 12b and 12c must be detectably different from the relative geometry of markers 12c, 12d and 12f of body 11b. Thus, as shown in FIG. 2, the markers 12a, 12b and 12c of body 11a are separated by line segments SLab, SLbc and SLac, respectively, as shown. Further, the line segments SLab, SLbc, and SLac intersect, as shown to form angles θab, θbc, and θac, as shown. Likewise, the markers 12d, 12e and 12f of body 11b, are separated by line segments SLde, SLef and SLdf, respectively, as shown. Further, the line segments SLde, SLef, and SLdf intersect, as shown, to form angles θde, θef, and θdf, as shown. Further, segment length SLab must vary in length from segment SLac and SLbc, as must segment length SLbc vary in length from segment SLac. The variance, Δ, in the preferred embodiment is 5.0 mm. Thus, if the length of segment SLab is SLab, the length of segment SLbc is at least SLab±Δ and the length of segment SLac is at least SLab±Δ and at least SLab±Δ. That is, the length of all the segments SLab, SLbc and SLac must differ from each other by Δ. Further, a body with 3 markers will have 3 segments. In general, however, the number of segments is equal to N*(N−1)/2, where N is the total number of markers. Body 11a has a pair of segments SLab, SLbc which are equal in length to the pair of segments SLde, SLef on body 11b; these can still be tracked if the relative angle θab between segment SLab, SLbc on body 11a is different than the relative angle θde between segment SLde, SLef on body 11b. The marker geometry can be collinear, non-collinear, co-planar or non-coplanar, as required by the application. The pair of bodies 11a, 11b are tracked simultaneously if pairs of like segments amongst all bodies 11a, 11b being tracked have unique relative angles, again where the term unique is a threshold value difference based on the accuracy of the system 10. That is, the markers 12a–12c, 12d–12f are placed on bodies 11a, 11b, respectively to provide each one of the bodies 11a, 11b with a unique signature, or finger-print, that can be recognized and tracked by the processor 28.

Before discussing the operation of the system 10, it should first be noted that the processor 28 has a memory 40 (FIG. 3) which stores three sets of Tables, 42–48; 50L, 50R, and 52; and 56–62. A first set of the Tables (i.e., A Rigid Body Definition Set of Tables, 42–48) defines the predetermined geometric relationship of the markers 12a–12d, 12e–12f for each one of the bodies 11a, 11b; a second set of the Tables (i.e., Sensor Generated Data Tables, 50L, 50R and 52) contain information that is generated each time the sensors 14L, 14R are scanned and these Tables 50L, 50R and 52 are therefore not associated with any particular body; and, a third set of Tables (i.e., Processing Tables, 56–62) which are generated by the processor while the rigid bodies 11a, 11b are being identified and tracked. These Tables (and Counters 51L, 51R and 53, to be described), reside in the processor 28 and are used by the processor 28 during the operating sequence thereof.

Rigid Body Definition Tables, 42–48

The Rigid Body Definition Tables include: a Marker Position Table, 42; a Marker Segment Table, 44; a Marker Segment Dot (•) Product Table, 46 and a Marker Segment Set Table, 48. These Rigid Body Definition Tables, 42–48 are for all bodies 11a, 11b and contain a priori known information about geometric relationship of the markers 12a–12c and 12d–12f, that are affixed to rigid bodies 11a 11b, respectively, to thereby provide each one of the bodies 11a, 11b with a unique signature, or finger-print, that can be recognized and tracked by the processor 28. These Rigid Body Definition Tables, 42–48 are initialized once prior to the identification and subsequent tracking operations of the processor 28.

Marker Position Table, 42

Each rigid body 11a, 11b, has associated with it a Marker Position Table 42, as shown for body 11a in FIG. 11. The Marker Position Table 42 includes the 3D position (X', Y', Z') of each marker 12a, 12b and 12c associated with the rigid body 11a, for example. Referring to FIG. 11, the Marker Position Table 42, is shown for body 11a, it being understood that Table 42 has a similar table for body 11b. The 3D position of marker 12a, 12b, and 12c is shown.

Segment Length Table, 44

Each rigid body 11a, 11b has a Marker Segment Length Table 44, (FIG. 12) associated with it that contains the set of segment lengths of a body 11a, 11b. A segment is considered the line joining a pair of markers 12a, 12b, 12c for body 11a and markers 12d, 12e and 12f for body 11b. Thus, as noted above in connection with FIG. 2, body 11a has segments SLab, SLbc, and SLac and body 11b has segments SLde, SLef and SLdf. The complete set of segments for a body is every combination of marker pairs. Thus, there are N*(N−1)/2 segments for a body where N is the number of markers affixed to the body. Referring to FIG. 12, Marker Segment Length Table 44, is shown for body 11a. The segment lengths SLab, SLbc, and SLac are shown.

Marker Segment Set Table, 48

Each rigid body 11a, 11b has a Marker Segment Set Table 48 (FIG. 13) associated with it that contains the marker segment sets. There is one entry in the Table 48 for each marker. Each marker entry will contain 2 or more segments that are connected to this marker. There will be N−1 segments attached to each marker for an N marker body. FIG. 13 shows the set of segments for a rigid body 11a. Each marker 12a, 12b, 12c has associated with it two segments (i.e., segment 1 and segment 2, in FIG. 13). Thus, as indicated in FIGS. 2 and 13, for body 11a, marker 12a is attached to segments SLab and SLac; marker 12b is attached to segments SLab and SLbc. Marker 12c is attached to segments SLac and SLbc. It is understood that a similar table would be for marker 11b.

Segment Dot (•) Product Table, 46

Each rigid body has a Segment Dot (•) Product Table 46 (FIG. 14) associated with it that contains the list of dot (•) products between each combination of segments. The dot (•) product is used as a determination of the angle, θ, between the segment lengths, SL, when the segments are treated as vectors transposed to the origin of X, Y, Z system 10 co-ordinate system. There will be $N*(N-1)/2$ combinations of segment pairs where N is the number of segments in the rigid body. The example FIG. 14 shows the set of dot (•) products for body 11a. Here, the dot (•) product for angle θa,b between segment lengths SLab and SLbc is shown to be 3600. Likewise the dot (•) product for angle θa,c between segment lengths SLab and SLac is shown to be 0 and the dot (•) product for angle θb,c between segment lengths SLbc and SLac is shown to be 2500. It should be understood that a similar table exists for body 11b.

Sensor Generated Data Tables, 50L, 50R and 52

The Sensor Generated Data Tables 50L, 50R and 52 include: Left and Right Sensor Energy Source Location Tables 50L, 50R; and a Raw 3D Marker Table 52.

Left and Right Sensor Energy Source Tables, 50L, 50R

Figure 3:
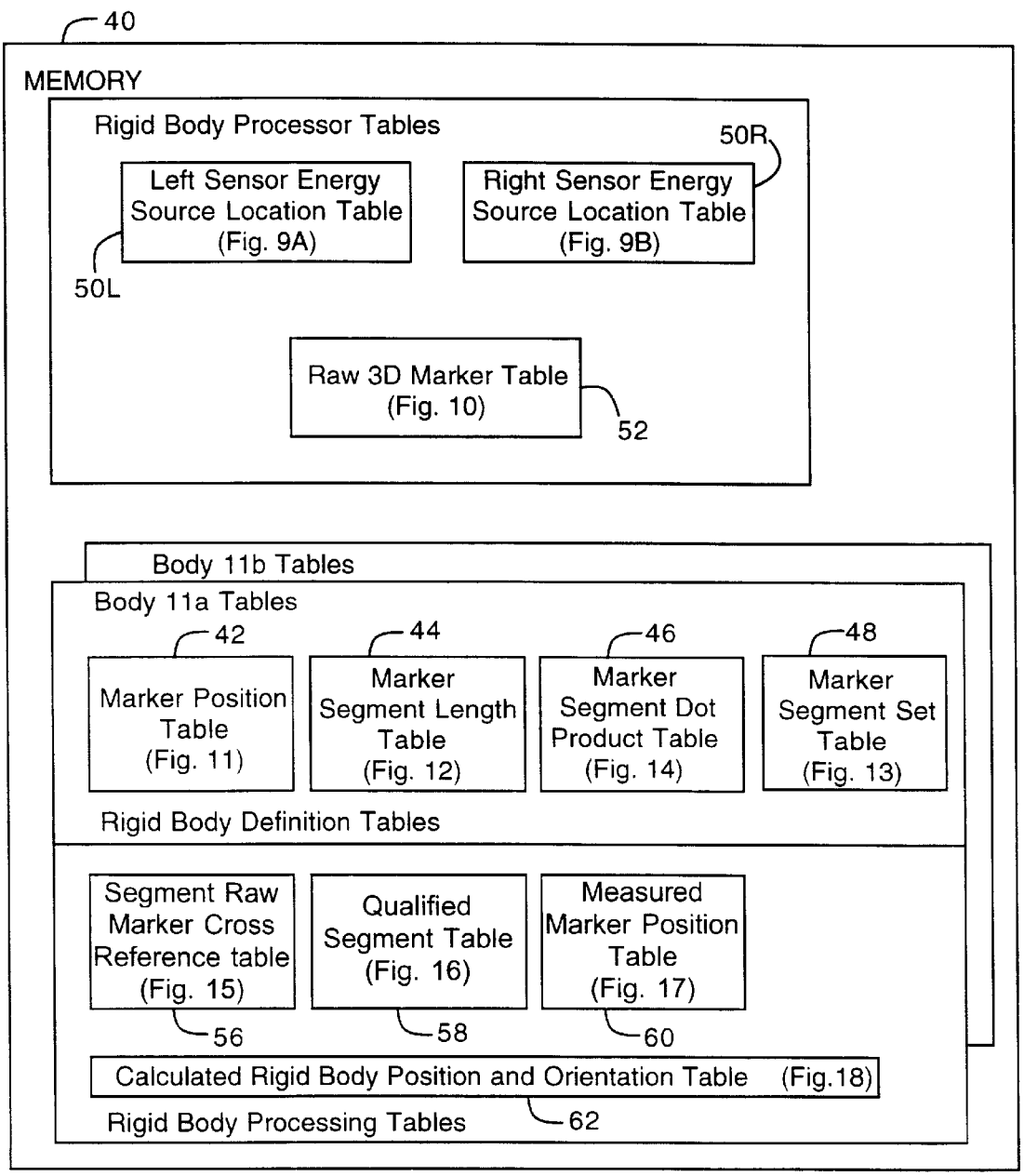
FIG. 3 is a diagram of a Tables stored in a memory of a processor used in the system of FIG. 1.

There is one Sensor Energy Source Table 50L and 50R in memory 40 for each area array CCD sensor 18L, 18R (FIGS. 1, 9A, 9B). There will be one entry for each energy spot detected on the CCD sensor 18L, 18R. The Left-Sources and Right-Sources Counters 51L, 51R, respectively, contain the number of the energy spots detected on the left and right sensor 18L, 18R respectively. Each entry will have a U and V value corresponding to the center of mass of the energy spot along the U axis and the V axis of the associated sensor 18L, 18R. In the preferred embodiment there will be left and right sensor energy source Tables, 50L, 50R (FIG. 3). Here, the are four energy sources $S_1-S_4$, $S_5-S_8$, detected by each one of the sensors 18L, 18R, respectively. as indicated in FIGS. 9A and 9B. It is noted that the sources $S_1-S_8$ are in the u,v co-ordinates of the sensors 18L, 18R, as indicated in FIGS. 9A and 9B.

Raw 3D Marker Table, 52

There is single Raw 3D Marker Table 52, (FIGS. 3, 10) in memory 40 that contains a single entry for each determined but unqualified marker location (raw markers). Each entry has an X, Y and Z (i.e., the X, Y, Z system 10 co-ordinate system) value corresponding to the coordinate system of the position sensor with the origin midpoint between the image sensors 18L, 18R. The Raw Marker Counter 53, contains the number of raw markers detected. Referring to FIG. 10, an example is given of 4 raw markers. In this example the markers 12a, 12b, and 12c of body 11a are detected and one stray unknown marker. The allocation of these markers R1–R4 is not known at this time with respect to markers 12a–12c and 12d–12f on body 11a and 11b, respectively. The sequence of operations will be used to determine the correspondence of these markers to body 11a or body 11b.

Processing Tables, 56–62

The Processing Tables are: a Segment Raw Marker Cross Reference Table 56; a Qualified Segment Table 58; a Measured Marker Position Table 60; and, a Calculated Rigid Body Position and Orientation (Pose) Table 62. These Processing Tables 56–62 are produced by the processor 28 for each of the rigid bodies 11a, 11b and are generated by the processor 28 while the rigid bodies are being recognized (i.e., identified) and tracked.

Segment Raw Marker Cross Reference Table, 56

Each rigid body has a Segment Raw Marker Cross Reference Table 56 (FIGS. 3, 15) associated with it that contains all the raw marker 12a, 12b and 12c pairs that have a separation distance close to the defined segment length of the rigid body. The term close is defined by a length difference between the defined segment and the segment under test, which is less than some predefined value (i.e., a distance detectable by the system 10). In the preferred embodiment this value is 1.5 mm. The following example (FIG. 15) illustrates pairs of markers that match the predefined segment lengths SLab, SLbc, SLac of the body 11a. The raw marker pair data is determined by the processor 28 in accordance with a method to be described in connection with FIGS. 6A and 6B. Suffice it to say here, however, that, in this example, the two sets of four raw energy data S1–S8 detected by the right and left sensors 14L, 14R, FIGS. 9A, 9B) are converted by the processor 28 into four raw markers R1–R4 (in the system 10 X, Y, Z co-ordinate system) and are stored in the 3D Raw Marker Table, 52 (FIG. 10). Thus, because there are four raw markers R1–R4 there are six segment lengths (i.e., SL12, SL13, SL14, SL23, SL24 and SL34). Here, in this example, raw markers R1 and R2 are separated by a segment length SL12 which is close to the length of segment SLab. Raw markers (R1, R4), (R3, R4), and (R2, R3) are all separated by a length close to length of segment SLbc. Also raw markers (R2, R4), and (R1, R3) are all separated by a length close to length of segment SLac. This data is stored in the Segment Raw Marker Cross Reference Table, 56 as indicated in FIG. 15.

Qualified Segment Table, 58

There is one Qualified Segment Table 58 (FIGS. 3, 16) for each rigid body 11a, 11b. This Table 58 is generated during the segment verify phase, to be described in connection with FIG. 7. Suffice it to say here, however, that there is one entry for each segment of the rigid body. The example in FIG. 16 shows segment SLab, SLbc, and SLac of body 11a are all qualified.

Measured Marker Position Table, 60

Each rigid body 11a, 11b, has a Measured Marker Position Table 60 (FIGS. 3, 17) associated with it that contains the 3D positions of the raw markers R1–R4 that have been identified, validated, and mapped to the body actual markers 12a–12c, 12d–12f. The example given in FIG. 17 shows the measured position of markers 12a, 12b, and 12c of body 11a where actual marker 12a corresponds to raw marker R2, actual marker 12b corresponds to raw marker R4, and actual marker 12c corresponds to raw marker R1.

Calculated Rigid Body Position and Orientation Table, 62

Each rigid body has a Calculated Rigid Body Position and Orientation Table 62 (FIGS. 3, 18) associated with it that contains the transformation of the rigid body. This is the pose that is determined from the Measured Marker Position Table 60 (FIG. 17) based on the Marker Position Table 42 (FIG. 11). In other words, the pose is the transformation that moves the Marker Position Table 42 into the same space X, Y, Z co-ordinate system of system 10, as shown in Measured Marker Position Table 60. The example shown in FIG. 18 illustrates the pose of body 11a.

Sequence of Operations Overview

Figure 4:
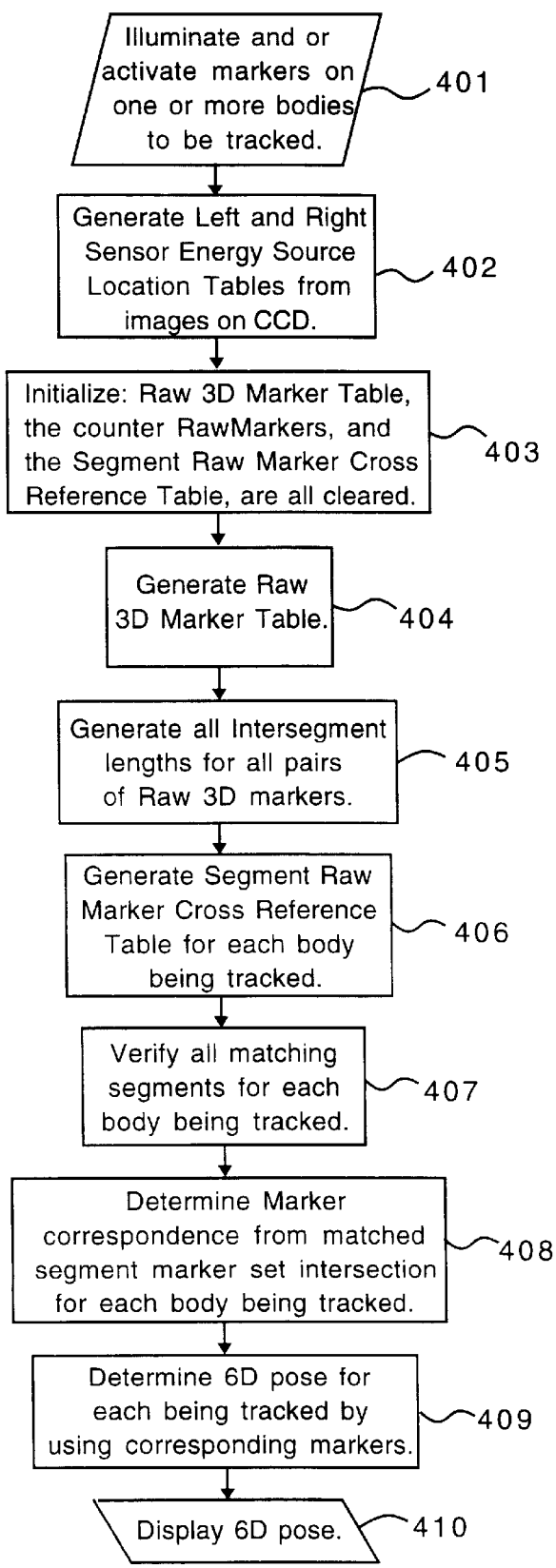
FIGS. 4, 5, 6, 6A, 6B, 7, 7A–7C, 8 and 8A–8B are flow diagrams which diagrammatically illustrate the sequence of operations of the system of FIG. 1, where

The pose, or orientation, of a body or bodies can be determined simultaneously and in real time from the following operations as illustrated in the flow diagram FIG. 4. In Step 401, the energy sources 24L and 24R (FIG. 1) and active marker 12b are activated. Referring to FIG. 1 these energy sources are focussed through the lens system 22L, 22R and project an image on the CCD sensors 18L, 18R. This image is scanned from the sensors 18L, 18R and any intensity above a certain threshold value will be analyzed by the processor 28. In Step 402, the position of the sensor energy sources are stored in Left and Right Sensor Energy Source Location Tables 50L, 50R (FIGS. 3, 9A, 9B). The position is in units of pixels. The horizontal axis of the sensor is called U and the vertical axis is called V. In the preferred embodiment, a left and right sensor 18L, 18R is used. The Left Sources and Right Sources Counters 51L, 51R, respectively, are set to the number of detected energy sources on the left and right sensors 18L, 18R respectively. In the example described in connection with FIGS. 9A and 9B there are four detected energy sources $S_1$–$S_4$, $S_5$–$S_8$ detected by each of the sensors 18L, 18R, respectively; thus the count in each one of the counters 51L and 51R are, in that example, 4.

In Step 403, appropriate Tables (i.e., Tables 52, 56) and Counters 51L, 51R and 53) are initialized for the subsequent sequence of operations. The Raw 3D Marker Table 52, the Raw Marker Counter 53 and the Segment Raw Marker Cross Reference Table 56, are all cleared. In Step 404, the energy sources stored in the Left and Right Sensor Energy Source Location Tables 50L, 50R are analyzed by processor 26 and Raw 3D Marker Table 52 (FIG. 10) is generated. The Raw Marker Counter 53 is set to the number of raw markers detected. At this time it is unknown what these markers are. Some may be markers from the body or bodies being tracked, other may be reflections, and still others may be artifacts caused by the marker detection method. Triangulation methods to generate the 3D position from stereoscopic views is well known in the art and one method will be described later in the section Generate Raw 3D Marker Table 52.

In Steps 405 and 406, the distance, i.e. segment lengths, SL12, SL13, SL14, SL23, SL24 and SL34, between all combinations of Raw 3D Markers pairs is calculated. These calculated lengths are compared to the Segment Length Table 44 (FIG. 12) for each body 11a, 11b being tracked. Matches are placed in the Segment Raw Marker Cross Reference Table 56 (FIG. 15) for each body 11a, 11b. These steps are described in detail in FIGS. 6A and 6B in connection with the Generate Segment Raw Marker Cross Reference Table 56 (FIG. 15).

In Step 407, all possible segment guesses in the Segment Raw Marker Cross Reference Table 56 (FIG. 15) for each body 11a, 11b are verified by comparing the relative angles, θ, between the segment lengths, SL, of the body 11a, 11b. These steps are described in detail later in the connection with FIG. 7, Segment Verify. In Step 408, the correspondence between the raw 3D markers R1–R4, in the example given above, and the bodies 11a, 11b actual markers 12a–12c, 12d–12f, respectively, is determined by set intersection methods using the body's Marker Segment Set Table 48 (FIG. 13) in conjunction with the body's Segment Raw Marker Cross Reference Table 56 (FIG. 15). The raw 3D markers are mapped into the body's Measured Marker Position Table 60 (FIG. 17). These Steps are described in detail later in connection with FIG. 8, Marker Correspondence Extraction.

In Step 409, the body's orientation (pose) is determined by the markers contained in the body's Measured Marker Position Table 60 (FIG. 17). Methods for determining the 6 degrees of freedom for a rigid body from discrete markers is well known in the art and will not be described here. Finally, in Step 410, the pose of all the bodies are stored in Table 62 (FIG. 18) and can be displayed. The pose can also be stored, transmitted to another computer, or further processed, as desired. The above sequence will become more readily apparent with the use of an example and the detailed descriptions below.

Generation of the Raw 3D Marker Table, 52

Figure 5:
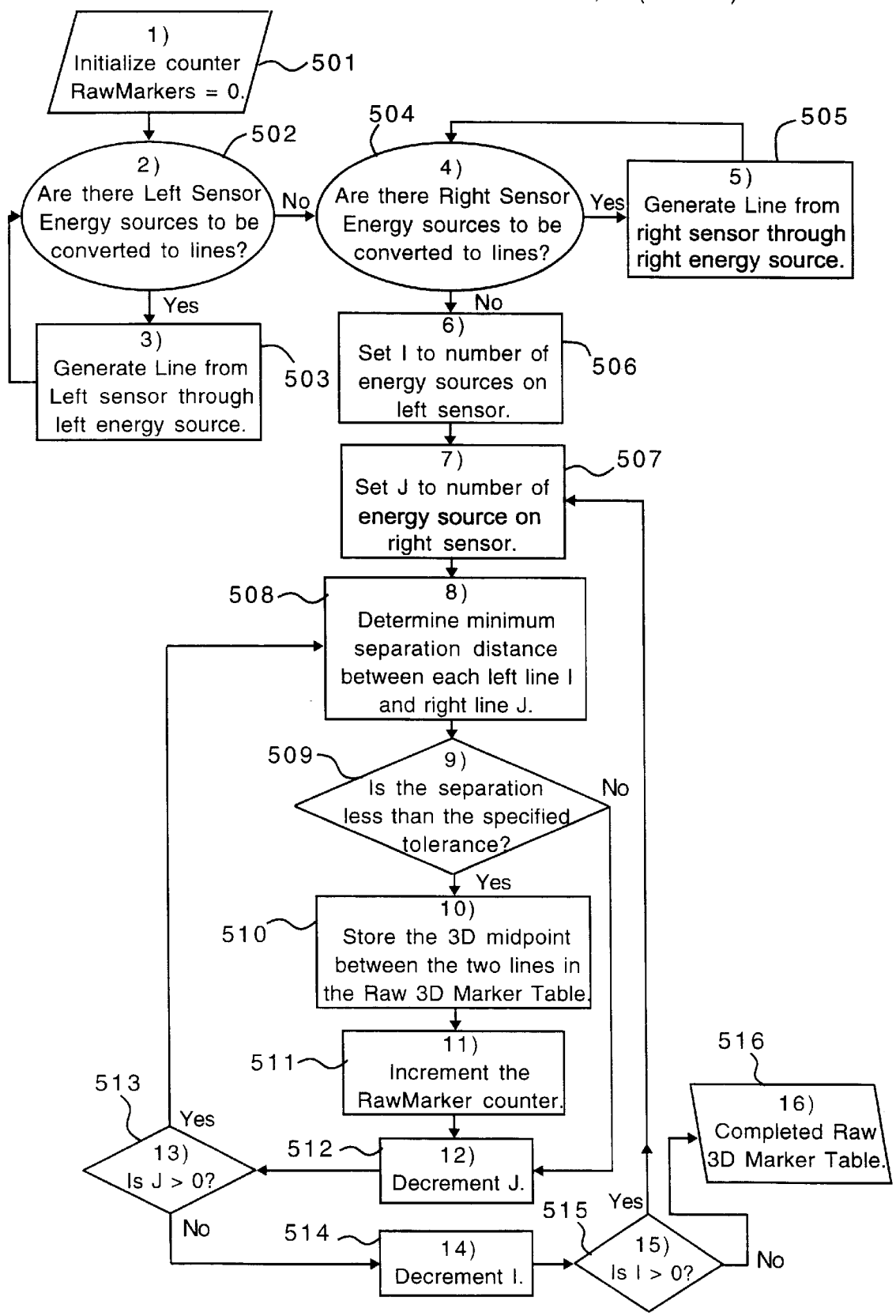
Figure 6:
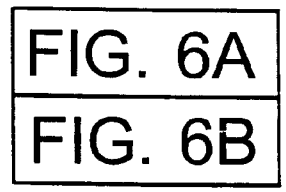

The energy sources $S_1$–$S_4$, $S_5$–$S_8$ (FIGS. 9A and 9B) stored in the Left and Right Sensor Energy Source Location Tables 50L, 50R are analyzed and Raw 3D Markers R1–R4 (FIG. 10) are determined. The Raw Marker Counter 53 is set to the number of raw markers detected. Referring now to FIG. 5, the following method for generating 3D positions from two stereoscopic images will be described. The following method is well known in the art and other methods are available.

In Step 501, the Raw Marker Counter 53 is initially set to 0. Parametric lines equations are generated for each Left Sensor Energy Source 14L and each Right Sensor Energy Source 14R in Steps 502, 503, 504 and 505. A line is between a point on one of the sensors 18L, 18R (i.e., at the V=U=$Z_s$=0, or origin of the sensors co-ordinate system) and one of the energy source $S_1$–$S_4$. Thus, there are four lines (i.e., left lines) from sensor 18L to each of the detected sources $S_1$–$S_4$. Likewise, there are four lines (i.e., right lines) from sensor 18R to each of the detected energy sources $S_5$–$S_8$. In Steps 506, 507, and 512 to 515, a double loop is processed that will pair every left line with every right line. The number of total iterations of this loop will be equal to Left Sources 52L*Right Sources 52R. In the example described above, there are 4 Left Sources S1–S4 and 4 Right Sources S5–S8 (FIGS. 9A and 9B) that will take 16 iterations to compute Table 52 (FIG. 10).

In Steps 508 and 509, the minimum distance between a left and a right line is determined. If this distance is less than a predefined minimum then the lines are considered intersecting and a possible 3D marker $R_1$–$R_4$ has been discovered. This marker is considered Raw since it is unknown at this time if it is a valid marker. There are 4 such matches in example shown in FIG. 10. The minimum separation is a function of the system accuracy and is kept as small as practical to reduce the number of false markers. In Step 510 and 511, the 3D mid-point between the left and right lines is placed in the Raw 3D Marker Table 52 (FIG. 10). The Raw Marker Counter 53 is incremented.

Upon completion of Steps 501 to 515, the Raw Marker Counter 53 contains the number of Raw Markers detected and the Raw 3D Marker Table 52 (FIG. 10) is complete. From this point forward all subsequent decisions are made on 3D markers and the 2D Sensor Energy Locations are no longer required. For the example there are 4 Raw 3D Markers R1–R4 detected. It is unknown at this time what each of the markers is.

Figure 7:
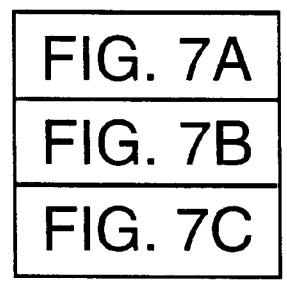
Figure 8:
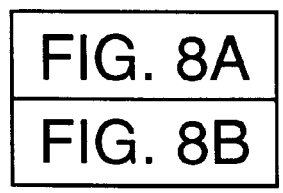

Generation of the Segment Raw Marker Cross Reference Table, 56 (FIG. 15) for All Rigid Bodies In overview, the next sequence will perform the following. All the possible segments between all Raw 3D Markers (e.g. R1–R4) in Table 52 (FIG. 10) are compared to all the segment lengths SLab, SLbc, SLac, and SLde, SLef, SLdf of each body 11a, 11b, respectively, in Table 44, FIG. 12. If a match is discovered the Raw 3D Marker pair is added to the Segment Raw Marker Cross Reference Table 56 (FIG. 15) for that body. The same raw segment under test may match to several rigid bodies. As well, a rigid body segment may have several raw test segments that match. These will be filtered out in a later operation, Segment Verify (FIG. 7).

Figure 6A:
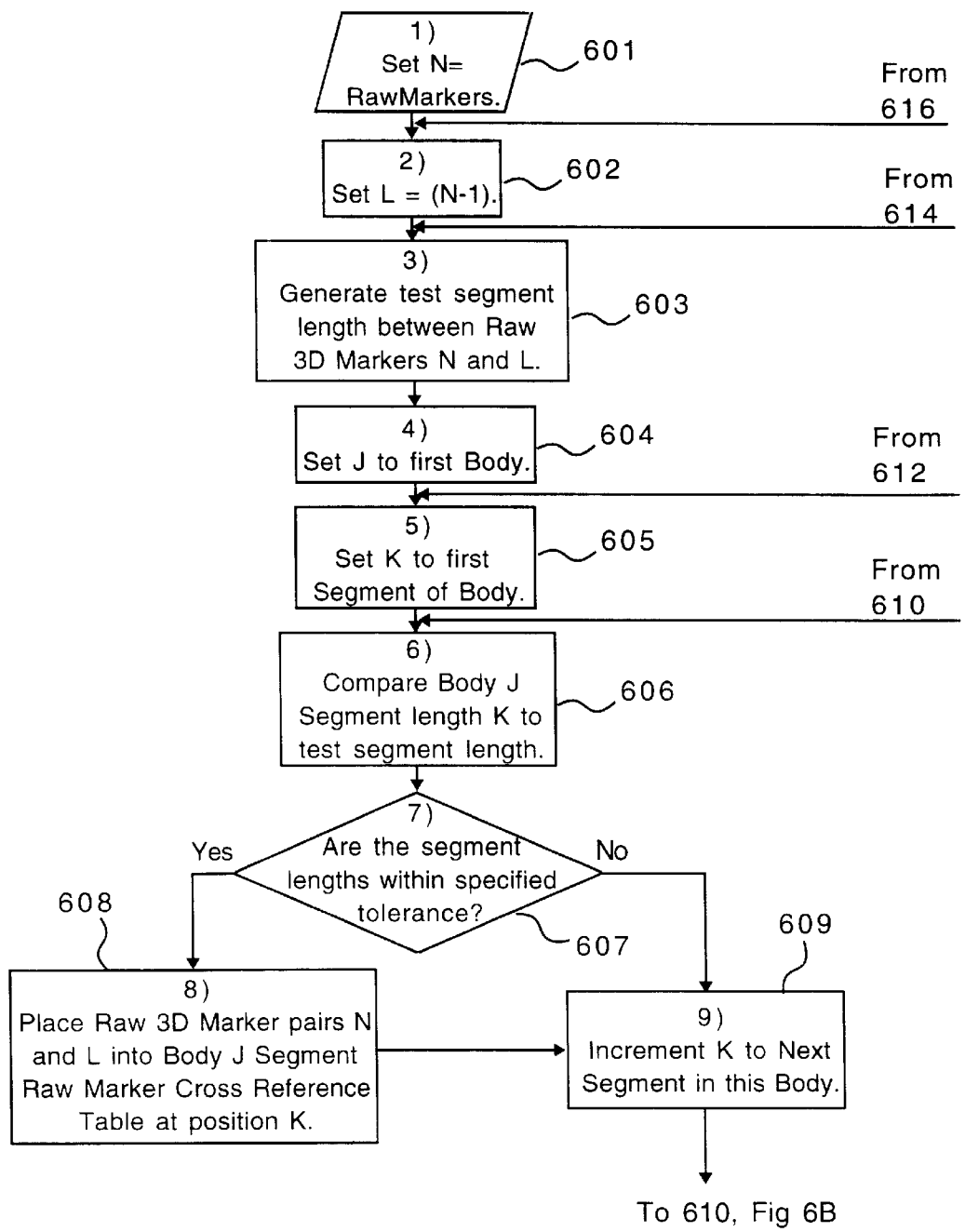
Figure 6B:
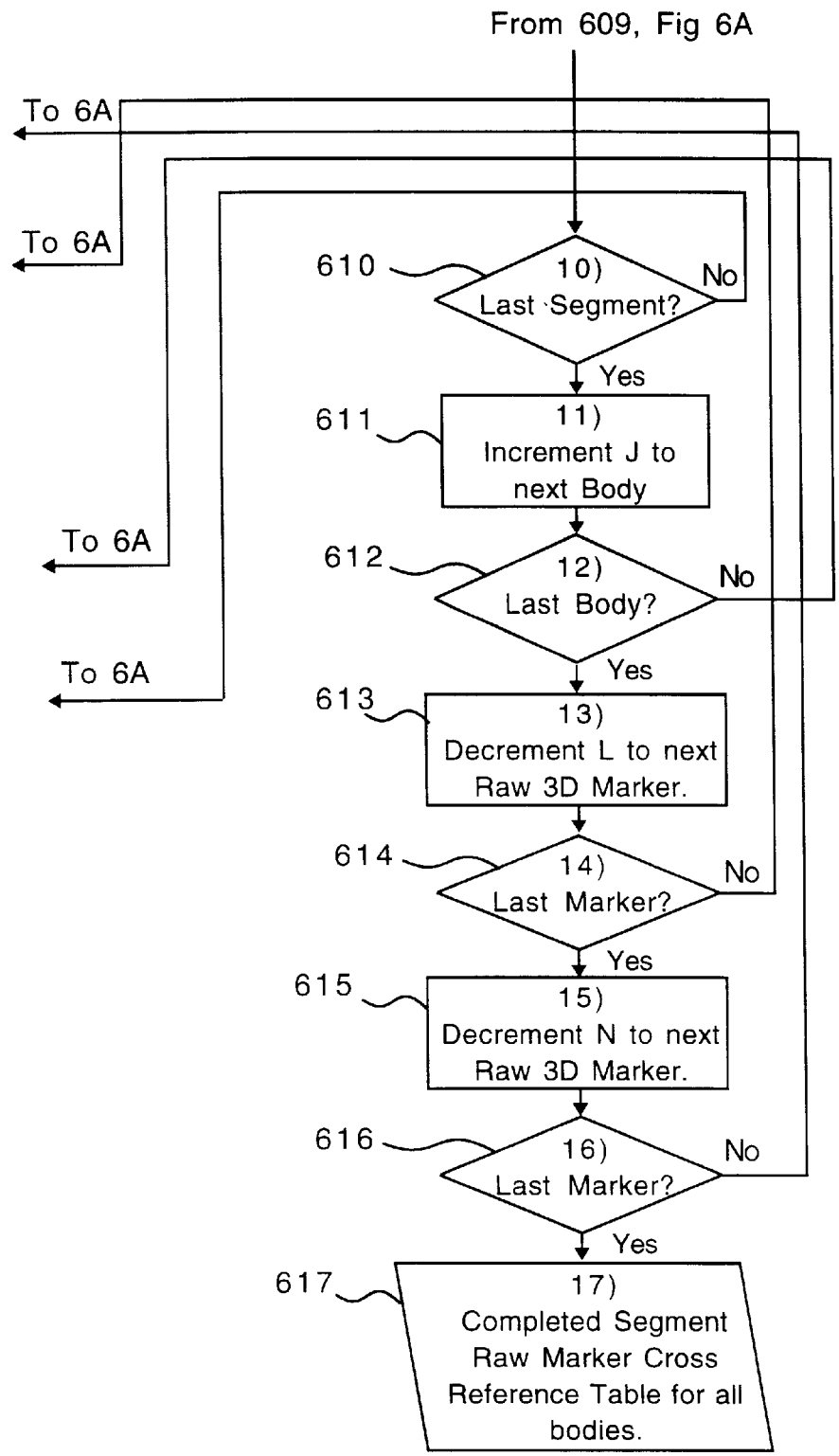
Figure 7A:
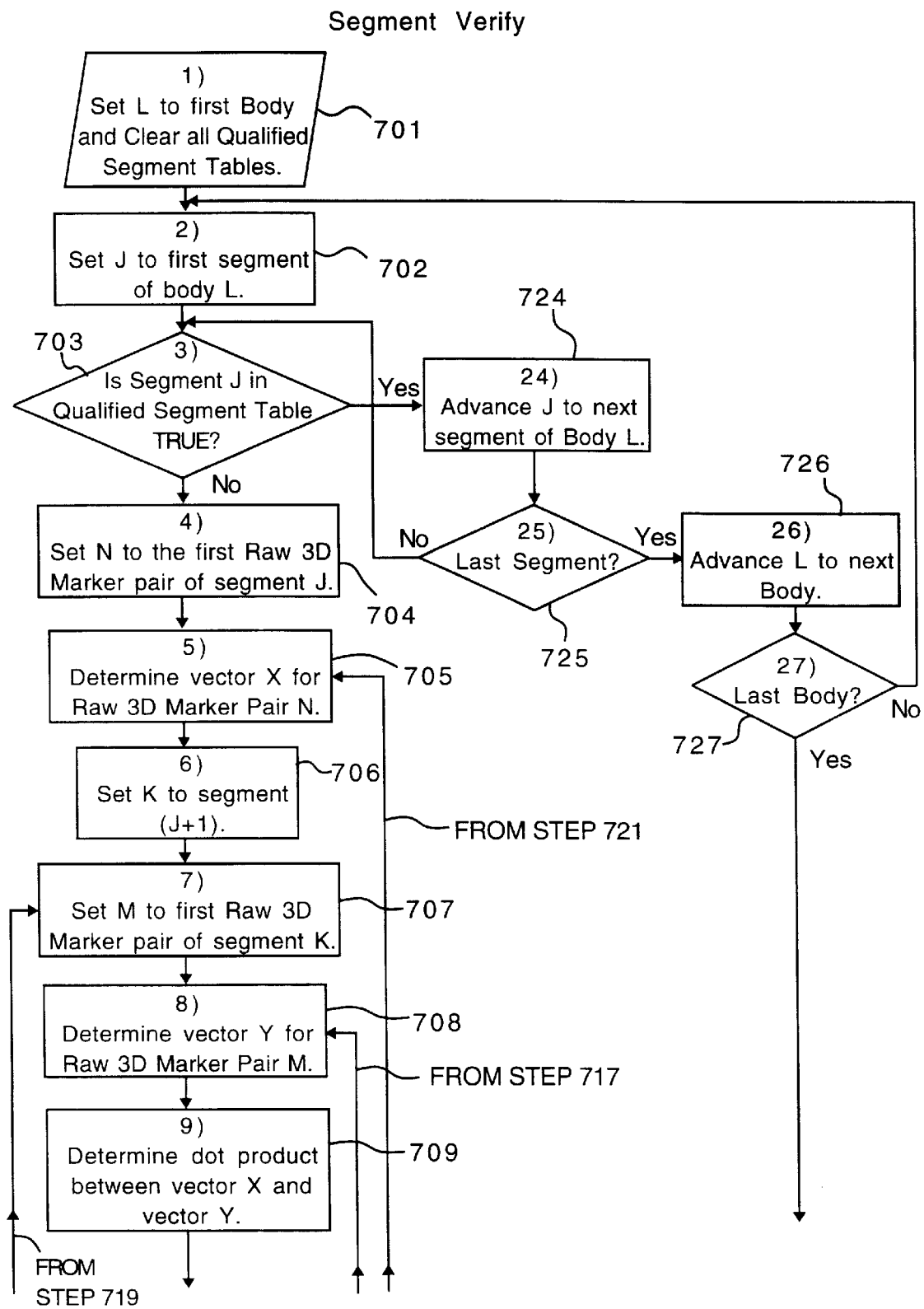
Figure 7B:
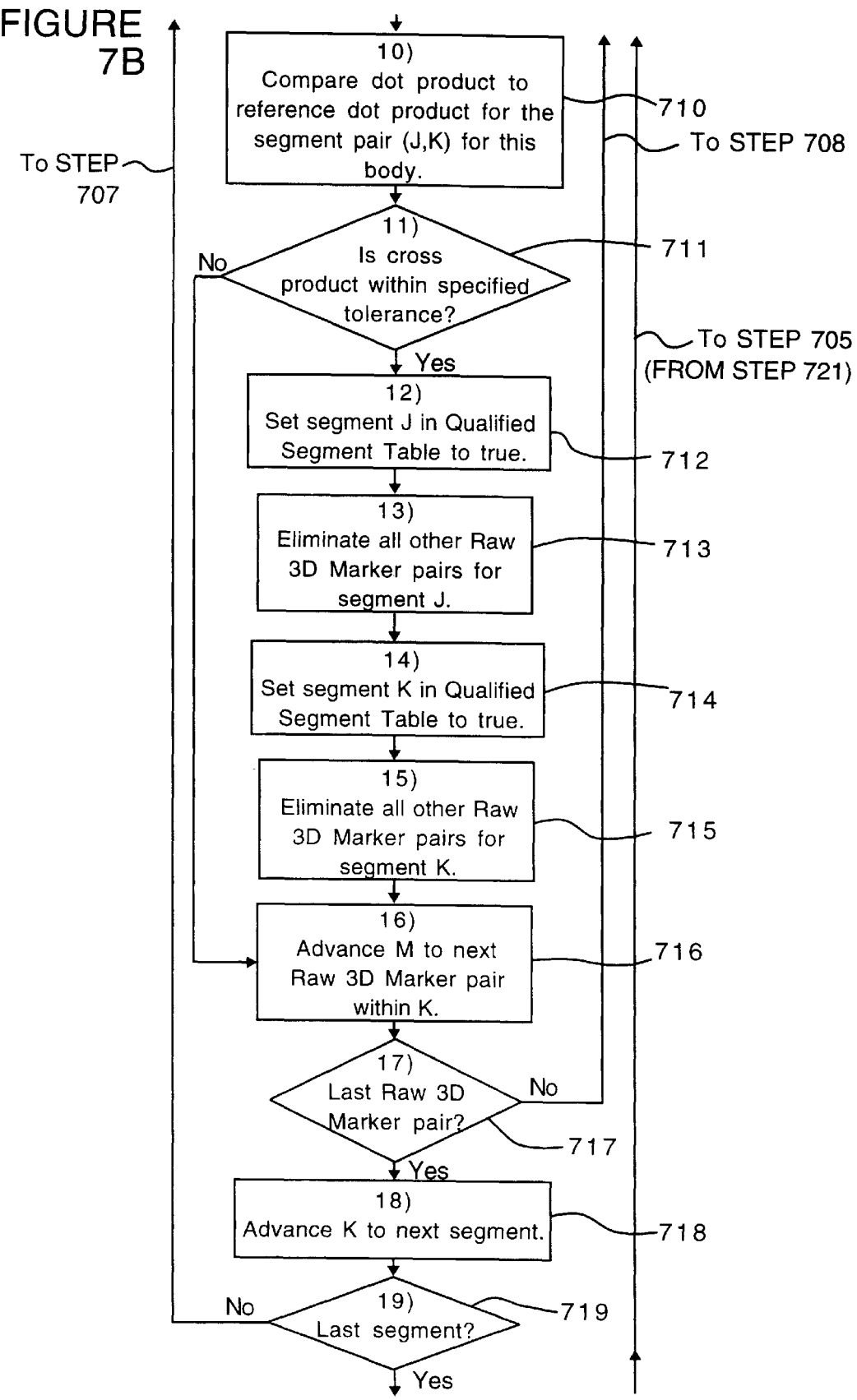
Figure 7C:
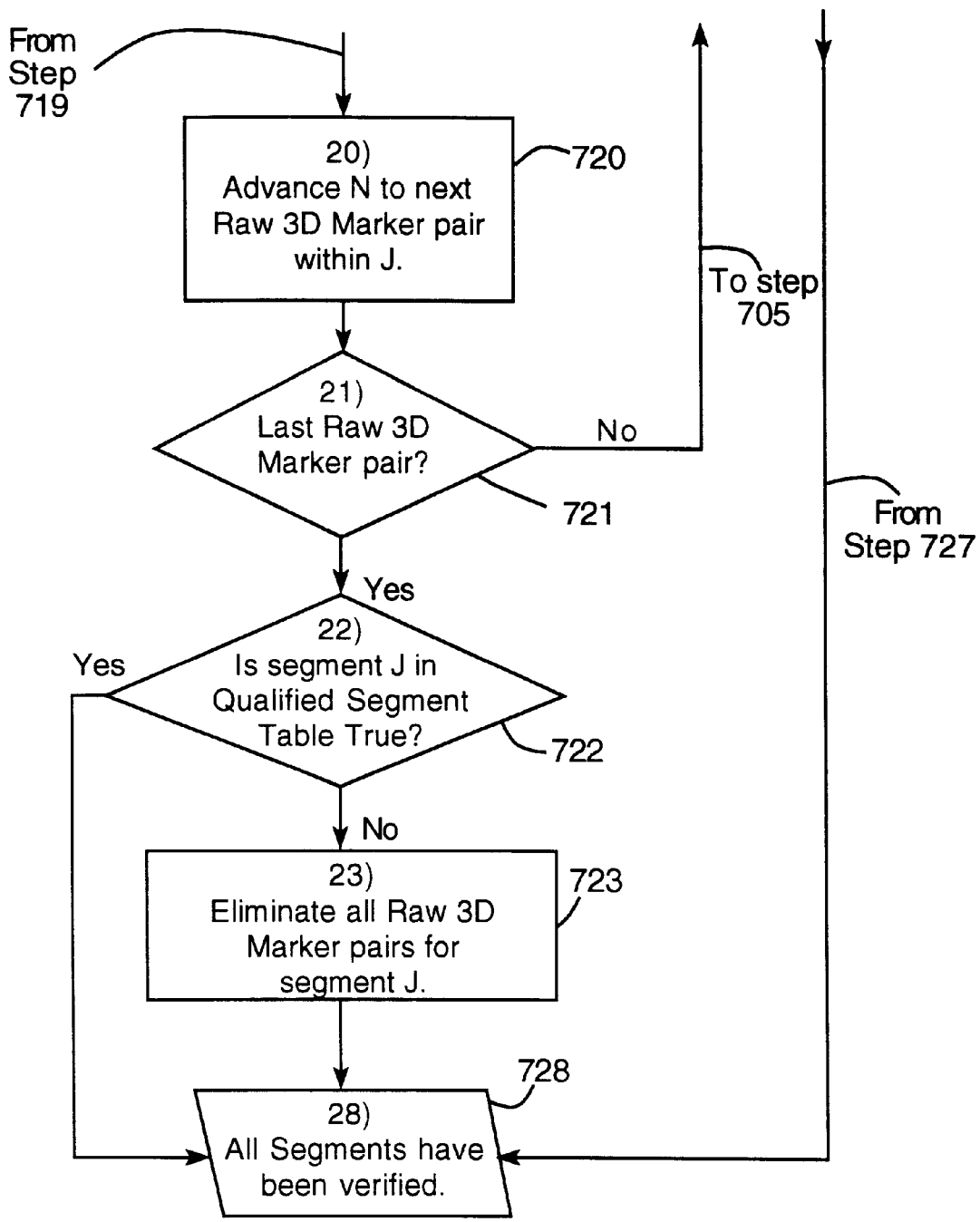
Figure 8A:
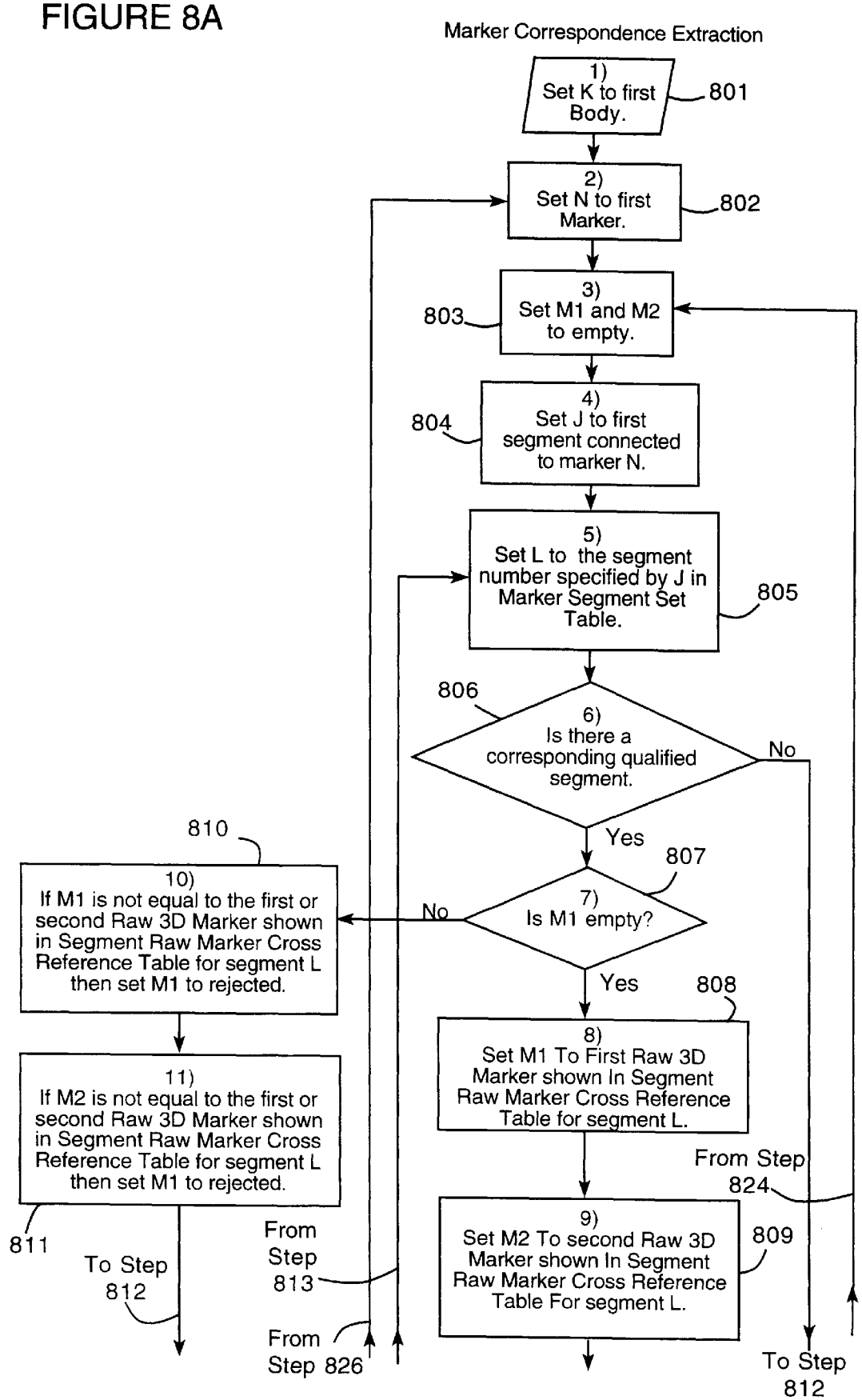
Figure 8B:
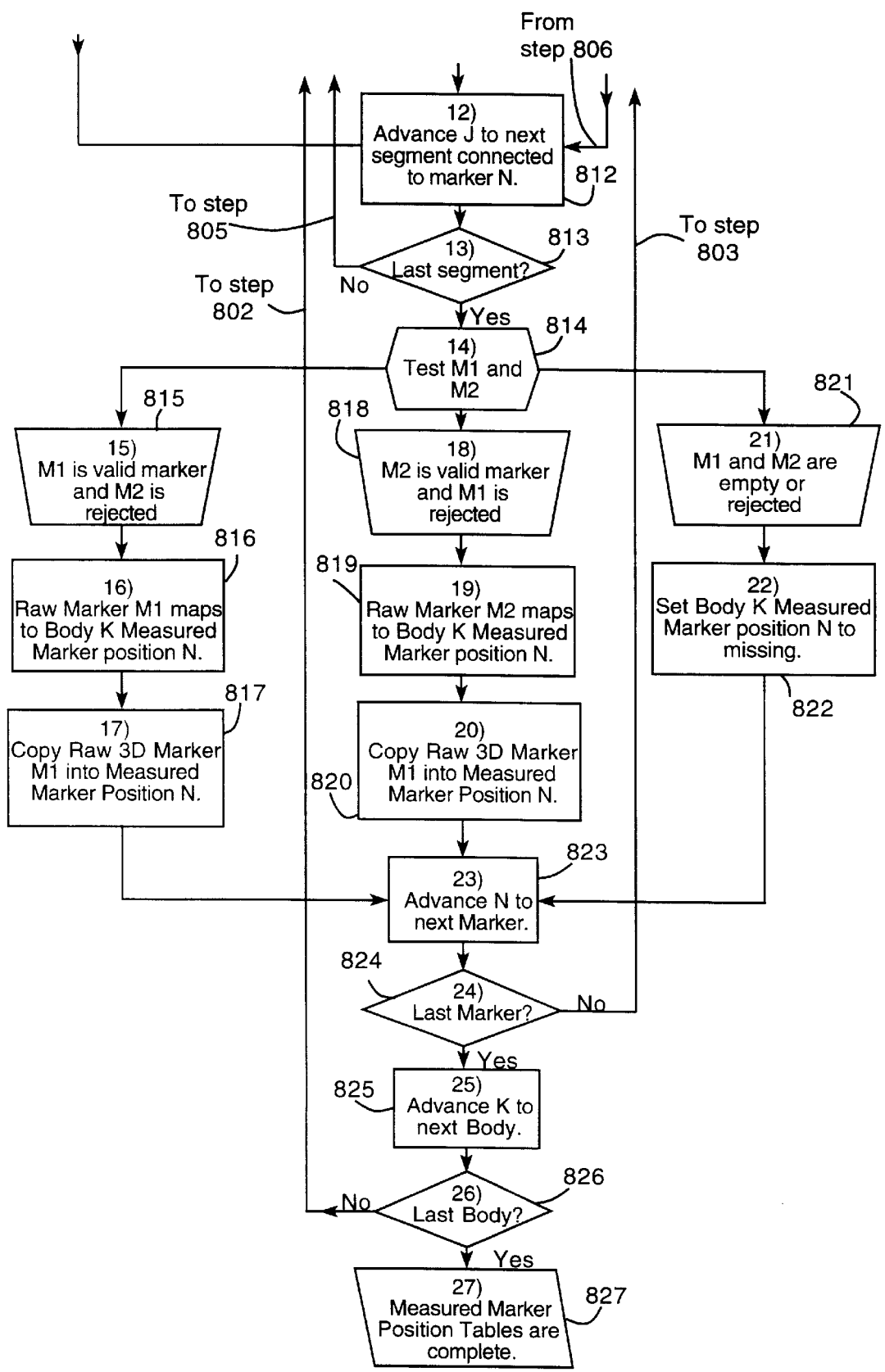

The above will be clarified by use of an example and the flow diagram FIGS. 6A and 6B, Generate Segment Raw Marker Cross Reference Table, 56 for all Rigid Bodies. In Steps 601, 602, and 613 to 616, a two deep processing loop is controlled. The two outer most loops are indexed by counters N and L, not shown but included in processor 26, used to pair up all combinations of Raw 3D Markers R1–R4. There are N'*(N'–1)/2 segments (marker pairs) where N' is equal to Raw Markers R1–R4, for example. Here, N'=4. The segment length between Raw 3D Markers N and L is calculated once per iteration of the outer two loops (Steps 603). This length is called the test segment and is used in the following section.

In Steps 604, 611 and 612, a processing loop is controlled by counter J, not shown but included in processor 28, that sequences through all the rigid bodies being tracked. In Steps 605, 609, and 610, a processing loop is controlled by counter K, not shown but included in processor 28, that sequences through all the segments within one of the bodies 11a, 11b, here indicated in general by body J. The segment matching is performed in Steps 606, 607 and 608. The segment K of body J is compared to the test segment. A segment is considered to be a match if the difference is less than a predefined value. When a match occurs the Raw 3D Marker pair index counters N and L values are placed in the next available pair in the Segment Raw Marker Cross Reference Table 56 (FIG. 15) for body J for segment K. The counter "Total Raw Pairs", not shown but included in processor 28, for segment K is incremented. The predefined value is a function of the system accuracy and is kept as small as practical to reduce the number of segment matches, but large enough to avoid unnecessarily rejecting valid segments.

In the given example referring to FIG. 15, for body 11a, segment length SLab has a single match being Raw 3D Marker pairs R1 and R2. Segment length SLbc has 3 matches being Raw 3D Marker pairs: R1 and R4; R3 and R4; and, R2 and R3. Segment length SLac has two matches being Raw 3D Marker pairs: R2 and R4; and, R1 and R3. It is clear that 3 of the 6 segments are not part of the rigid body 11a and must be eliminated by Segment Verify (FIG. 7).

Segment Verification

All possible segments defined by the Raw 3D Marker pairs in the Segment Raw Marker Cross Reference Table, 56 (FIG. 15) for each body 11a, 11b are verified by comparing the relative angles, θ, between the segment lengths, SL, of the body 11a, 11b. The method will become clear by examining the flow diagram shown in FIGS. 7, 7A–7C using the following example. The segment verify operation has a five deep control loop.

In Steps 701, 726 and 727, a processing loop is controlled by counter L that sequences through all the rigid bodies being tracked. In Step 701, the Qualified Segment Table, 58 (FIG. 16) is cleared for the rigid body L being verified. A processing loop is controlled by counter J in Steps 702, 724, and 725, which sequences through all the segment lengths SL of body L. The control loop is entered if the segment J is not already qualified, as indicated in the Qualified Segment Table, 58 (FIG. 16).

A processing loop is controlled by counter N in Steps 704, 720, and 721, which sequence through all the Raw 3D Marker pairs in the Segment Raw Marker Cross Reference Table, 56 (FIG. 15) of body L for segment J if the segment J in the Qualified Segment Table, 58 (FIG. 16) has not been qualified (i.e., set to FALSE (Step 703). In Step 705, the vector X, transposed to the system 10 co-ordinate axis origin, is calculated for the Raw 3D Marker pair N of segment J for body L. A processing loop is controlled by counter K in Steps 706, 718, and 719, which sequences through all the segment lengths subsequent to segment J within body L.

A processing loop is controlled by counter M in Steps 707, 716, and 717, which sequences through all the Raw 3D Marker pairs in the Segment Raw Marker Cross Reference Table, 56 (FIG. 15) of body L for segment K. In Steps 708 through 711, the vector Y, transposed to the origin, is calculated for the Raw 3D Marker pair M of segment K for body L. The dot (•) product between vector X and vector Y is determined. This dot (•) product is compared to the actual dot (•) product for segment pair J and K as stored in Segment Dot Product Table, 46 (FIG. 14) for body L. If the difference is less than a predefined value, a match is found. The predefined value is a function of the system 10 accuracy and is kept as small as practical to reduce the number of false segment matches, but large enough to avoid unnecessarily rejecting valid segments. The preferred embodiment uses a value of 200.

When a match is found both segments are considered validated and Raw 3D Marker pairs N and M, for segments J and K in the Segment Raw Marker Cross Reference Table, 56 (FIG. 15) are considered true. In Steps 712 to 715, the valid Raw 3D Marker pair N and M is be moved to the first position in row J and K. A Total Raw Pairs Counter, not shown, is set to 1 and all other Raw 3D Marker pairs are eliminated. The segments J and K are set to true in the Qualified Segment Table, 58 (FIG. 16). Upon completion of each iteration of control loop J a test will be performed in Step 722. If segment J is not qualified after comparison to all subsequent segments, it is considered a bad segment. In Step 723, all Raw 3D Marker pairs are eliminated for segment J and the counter Total Raw Pairs will be set to 0. The process repeats for all bodies 11a, 11b (Steps 725–728).

An example will now be described referring to the Segment Raw Marker Cross Reference Table, 56 (FIG. 15), Segment Dot Product Table, 46 (FIG. 14), Raw 3D Marker Table, 52 (FIG. 10), and the flow diagram FIG. 7, Segment Verify. The following sequence of events can be traced through the flow diagram.

L=body 11a.
J=segment length SLab
Segment length SLab is not qualified.

N=pair 1 (R1, R2) of SLab
Generate vector for pair N (R1, R2)
K=segment length SLbc
M=pair 1 (R1, R4) of segment length SLbc
Generate vector for pair M (R1, R4)
Generate dot product, (•). (R1, R2)•(R1, R4)= 3599.995117
Compare to dot product Table, 46 (FIG. 14) for SLab, SLbc=3600
Match is found.
Delete Pair 2 (R3, R4) and pair 3 (R2, R3) of segment length SLbc.
Set segment length SLbc to qualified.
Set segment length SLab to qualified.
Advance M to next pair.
This was the last pair of segment length SLbc.
Advance K to segment length SLac.
M=pair 1 of segment length SLac
Generate vector for pair M (2,4)
Generate dot product (•), (R1, R2)•(R2, R4)=0.001304
Compare to dot product Table, 46 (FIG. 14) for segment lengths SLab, SLac=0
Match is found.
Delete Pair 2 (R1, R3) of segment length SLac.
Set segment length SLac to qualified.
Set segment length SLab to qualified.
Advance M to next pair.
This was the last pair of segment length SLab.
Advance K to next segment.
This was the last segment.
Advance N to next pair.
This was the last pair.
Advance J to next segment length SLbc.
This segment is qualified.
Advance J to next segment length SLac.
This segment is qualified.
Advance J to next segment.
This was the last segment.
Advance L to next body.
This was the last body.
Complete, See Table (Step 158).

Marker Correspondence Extraction

The correspondence between the Raw 3D Markers indexed in the Segment Raw Marker Cross Reference Table, 56 (FIG. 15) and the bodies actual markers is determined by set intersection methods using the body's Marker Segment Set Table, 48 (FIG. 13). The raw 3D markers R1–R4 are mapped into the body's Measured Marker Position Table, 60 (FIG. 17). These steps are described below as illustrated with an example using flow diagram FIG. 8, Marker Correspondence Extraction.

The marker correspondence extraction operation has a three deep control loop. In Steps 801, 825, and 826, a processing loop is controlled by counter K that will sequence through all the rigid bodies being tracked. A processing loop is controlled by counter N in Steps 802, 823, and 824, which will sequence through all the markers of body K. Set intersection is determined using registers M1 and M2. These are initially set to empty in Step 803. A processing loop is controlled by counter J in Steps 804, 812, and 813, which sequence through all the segment lengths attached to marker N of body K. For any given marker there will be B-1 connecting segments, where B is the total number of markers for the body.

In Step 805, L is set to the segment number indexed by J for marker N of body K in the Marker Segment Set Table, 48 (FIG. 13). In Steps 807 through 811, if there is a qualified segment length SL in the Segment Raw Marker Cross Reference Table, 56 (FIG. 15) the set intersection of markers is tested. If M1 is empty, then M1 is set to the first marker of the pair and M2 is set to the second marker of the pair. If M1 is not empty then a test is made to determine if M1 is equal to either the first or second marker of the pair. If M1 is not equal to either marker then it does not intersect with the set and will be set to rejected. Identically M2 is tested to either the first or second marker of the pair. If M2 is not equal to either marker then it does not intersect with the set and it will be set to rejected. This is repeated for all connecting segments to marker N.

At this time M1 and M2 can have various states which are tested in Steps 814, 815–817, 818–820, and 821–822. If M1 is a valid marker and M2 is rejected then the raw marker referenced by M1 corresponds to marker N. If M2 is a valid marker and M1 is rejected then the raw marker referenced by M2 corresponds to marker N. The Raw 3D Marker position referenced by M1 or M2 can be copied to the Measured Marker Position Table, 60 (FIG. 17). If both M1 and M2 are rejected or empty then there is no corresponding raw marker for marker N and the Measured Marker Position Table, 60 (FIG. 17) will be set to missing for this marker.

Example

Working through an example will clarify the above statements. Referring to Segment Raw Marker Cross Reference Table, 56 (FIG. 15), Marker Segment Set Table, 48 (FIG. 13), Raw 3D Marker Table, 52 (FIG. 10), Measured Marker Position Table, 60 and the flow diagram FIG. 8, Marker Correspondence Extraction. The following sequence of events can be traced through the flow diagram.

K=body 11a.
N=marker 12a.
Set M1 and M2 to empty.
Set J to first segment in Marker Segment Set Table, 48 (FIG. 13) for marker 12a.
Set L to segment length SLab as referenced by J. There is a qualified SLab segment in the Segment Raw Marker Cross Reference Table, 56 (FIG. 16). The raw marker pair is R1, R2.
M1 is empty therefore set M1=R1 and M2=R2.
Advance J to second segment in Marker Segment Set Table, 48 (FIG. 13) for marker 12a.
Set L to segment length SLac as referenced by J. There is a qualified SLac segment in the Segment Raw Marker Cross Reference Table, 56 (FIG. 15). The raw marker pair is R2, R4.
M1 is not empty.
M1 does not equal R2 or R4, therefore set M1 to rejected.
M2 does equal R2.
Advance J to third segment in Marker Segment Set Table, 48 (FIG. 13) for marker 12a.
This was the last segment for marker N
Test M1 and M2.

M1 is rejected and M2 is equal to R2 therefore Raw 3D Marker R2 corresponds to actual marker N (12*a*).

Copy 3D into Measured Marker Position Table, 60 (FIG. 17).

Advance N to marker 12*b*.

The above sequence is repeated for markers 12*b* and 12*c*. The process repeats with raw marker R2 mapping into actual marker 12*a*, raw marker R4 mapping into actual marker 12*b*, and raw marker R1 mapping into actual marker 12*c*.

Determination of Body Orientation (Pose)

At this time we have all the information required to determine the pose of the rigid body. This is well understood in the art and will not be described here. The pose is stored in the Calculated Rigid Body Position and Orientation Table, 62 (FIG. 18).

Other embodiments are within the spirit and scope of the appended claim.

What is claimed is:

1. A system for determining the spatial position and orientation of each of a plurality of bodies, comprising:
   at least three markers affixed to each one of the bodies in a predetermined, relative geometric relationship, such markers being adapted to emit energy in response to an activation signal and/or to reflect energy impinging thereon from an activatable energy source;
   an energy detector for detecting the energy emitted by one of the markers and/or the energy reflected by one of the markers;
   a processor having:
      a memory, such memory having stored therein the predetermined, relative geometric relation of the markers for each one of the bodies; and
      wherein the processor compares the stored predetermined geometric relation of the markers for each of the bodies with the energy detected by the energy detector to identify the bodies emitting and/or reflecting the detected energy.

2. The system recited in claim 1 wherein each body has the markers thereon disposed in a known and fixed relative geometry with unique segment lengths amongst all pairs of all the markers on such body.

3. The system recited in claim 1 wherein each body has the markers thereon with pairs of like segments amongst all bodies having unique relative angles.

4. The system recited in claim 3 wherein the detector comprises a stereometric arrangement of sensors.

5. A method for determining the spatial position and orientation of each of a plurality of bodies, comprising:
   detecting energy emitted by an active marker and/or energy reflected by a passive marker, at least three such markers being disposed on each one of the bodies in a predetermined, relative geometric relationship, the markers being adapted to emit energy in response to an activation signal and/or to reflect energy impinging thereon from an activatable energy source;
   providing a memory having stored therein the predetermined, relative geometric relation of the markers for each one of the bodies;
   comparing the stored predetermined geometric relation of the markers for each of the bodies with the energy detected by the energy detector to identify the bodies emitting and/or reflecting the detected energy.

6. The method recited in claim 5 including tracking the body in real-time.

7. The method recited in claim 5 including tracking a plurality of such bodies simultaneously.

8. The method recited in claim 5 including disposing on each of the bodies the markers in a known and fixed relative geometry with unique segment lengths amongst all pairs of all the markers on such body.

9. The system recited in claim 8 including disposing on each one of the bodies the markers thereon with pairs of like segments amongst all bodies having unique relative angles.

10. The system recited in claim 5 including disposing on each one of the bodies the markers thereon with pairs of like segments amongst all bodies having unique relative angles.

11. The method recited in claim 5 including determining a pose of one or more bodies in real-time in a closed form solution using a single sensor cycle.

12. The method recited in claim 5 including automatically recognizing and tracking the bodies.

* * * * *